United States Patent [19]

Aoki

[11] Patent Number: 5,330,166
[45] Date of Patent: Jul. 19, 1994

[54] UPPER MOUNTING STRUCTURE FOR A WHEEL SUSPENSION

[75] Inventor: Hirofumi Aoki, Chigasaki, Japan

[73] Assignee: Nissan Motor Co., Ltd., Japan

[21] Appl. No.: 873,853

[22] Filed: Apr. 27, 1992

[30] Foreign Application Priority Data

Jun. 24, 1991 [JP] Japan .................................. 3-177795

[51] Int. Cl.⁵ ......................... B60G 15/06; F16F 9/54
[52] U.S. Cl. .................................... 267/220; 280/707; 267/35
[58] Field of Search ...................... 267/140.15, 220, 35; 280/668, 692, 693, 696, 698, 702, 707; 180/300, 902

[56] References Cited

U.S. PATENT DOCUMENTS

| | | | |
|---|---|---|---|
| 4,434,977 | 3/1984 | Chiba et al. | 267/220 |
| 4,568,067 | 2/1986 | Iwata | 267/220 |
| 4,618,127 | 10/1986 | Le Salver et al. | 267/220 |
| 5,009,401 | 4/1991 | Weitzenhof | 280/668 |

FOREIGN PATENT DOCUMENTS

| | | | |
|---|---|---|---|
| 4214093 | 12/1992 | Fed. Rep. of Germany | 267/220 |
| 2572338 | 5/1986 | France | 267/220 |
| 0257308 | 11/1986 | Japan | 267/220 |
| 62-25206 | 2/1987 | Japan . | |
| 0055208 | 3/1987 | Japan | 280/707 |

*Primary Examiner*—Robert J. Oberleitner
*Assistant Examiner*—Chris Schwartz
*Attorney, Agent, or Firm*—Lowe, Price, LeBlanc & Becker

[57] ABSTRACT

An upper mounting structure for a wheel suspension includes a coil spring and a strut assembly each of which is adapted to be connected at its lower end with a wheel, while an upper end of the coil spring is coupled with a vehicle body through a spring insulator of high stiffness and an upper end of the strut assembly is coupled with the vehicle body through a strut mounting insulator of low stiffness. The structure further includes an additional insulator connecting between the upper ends of the coil spring and the strut assembly, which additional insulator has higher stiffness than the spring insulator within higher frequency range. Therefore, the strut assembly is capable of absorbing a surge vibration of the coil spring within the higher frequency range in spite of low stiffness of the strut mounting insulator.

7 Claims, 6 Drawing Sheets

Outer sleeve

FIG_4

FIG_5

FIG. 6

Outer sleeve

FIG_7

Outer sleeve

FIG. 8

UPPER MOUNTING STRUCTURE FOR A WHEEL SUSPENSION

BACKGROUND OF THE INVENTION

1. Field of the invention

The present invention relates to an upper mounting structure for a wheel suspension, especially for a strut-type wheel suspension, which may be suitably used for suspending a wheel from a vehicle body, and in particular relates to an upper mounting structure for a wheel suspension, which is capable of reducing mainly transverse vibration of the vehicle body due to a surge vibration of a suspension coil spring, thereby providing a comfortable ride feeling of a vehicle.

2. Description of the Related Art

Figure 1:
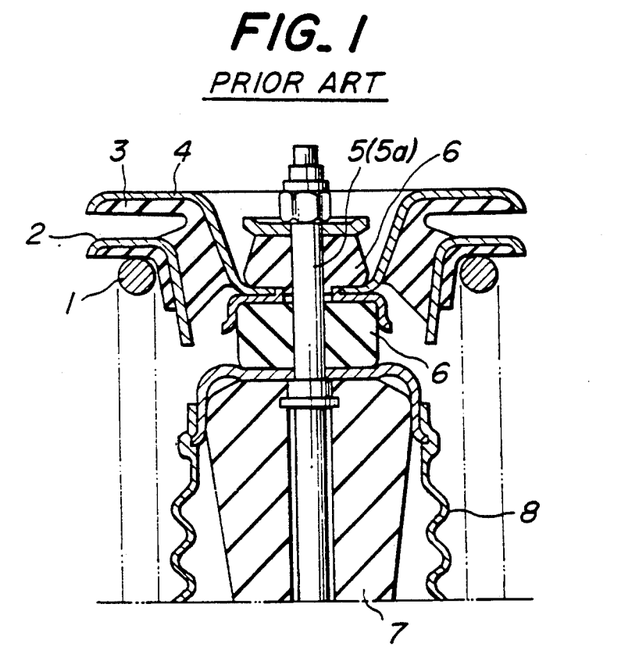
FIG. 1 is a longitudinal cross sectional view of an example of a conventional upper mounting structure for a wheel suspension.

A strut-type wheel suspension usually consists of a strut assembly, a suspension coil spring, a lower mounting structure and an upper mounting structure. Typical example of a conventional upper mounting structure for a strut-type wheel suspension is as shown in FIG. 1. The shown structure in FIG. 1 is of a so-called isolated input type and is disclosed, for example, in Japanese Utility Model Application Laid-Open Publication No. 62-25206.

In such upper mounting structure for a strut-type wheel suspension a suspension coil spring 1 is seated at its upper end near a vehicle body on a spring support 2 which is resiliently secured to an upper support 4 through a spring insulator 3 made from solid rubber material. The upper support 4 is adapted to be fastened to the vehicle body not shown by a bolt and nut means. In addition, the coil spring 1 is resiliently or rigidly engaged at its lower end with an outer sleeve not shown of a strut assembly 5 which further includes a piston rod 5a telescopically movable with respect to the above-mentioned outer sleeve.

The piston rod 5a penetrates freely through a central opening of the upper support 4 and is resiliently secured thereto through a pair of strut mounting insulators 6 made from solid rubber material. These strut mounting insulators 6 are arranged on either side of the upper support 4 to hold it therebetween and to make sure a connection between the piston rod 5a and the upper support 4.

Although not shown, the outer sleeve of the strut assembly 5 is resiliently or rigidly coupled with a knuckle not shown which is articulated to the vehicle body or a subframe fixed thereto as a part of the vehicle body through a plurality of links. This structure comprises the lower mounting structure for the strut-type wheel suspension. Alternatively, the lower mounting structure for the strut-type wheel suspension may be composed of the outer sleeve of the strut assembly, which is resiliently or rigidly coupled with a hub carrier articulated to the vehicle body or the subframe fixed thereto as a part of the vehicle body through a plurality of links. In FIG. 1, moreover, 7 represents a bumper rubber and 8 represents a dust boot respectively.

Figure 2:
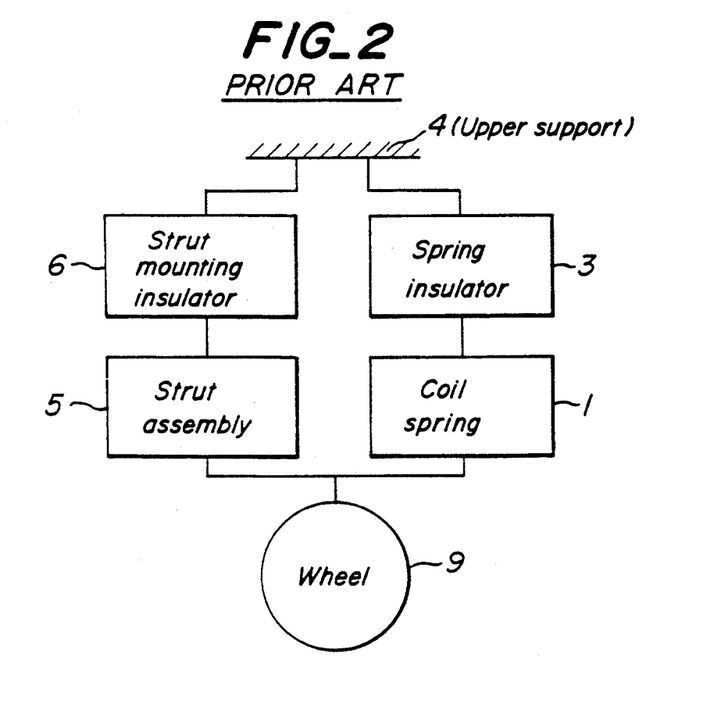
FIG. 2 is a schematic view showing a vibration system model of the conventional structure in FIG. 1.

FIG. 2 shows a vibration system model of the upper mounting structure in FIG. 1. As appreciated from FIG. 2, in the structure shown in FIG. 1 the coil spring 1 and the spring insulator 3 is arranged in serial relation with each other so as to form one vibration route, while the strut assembly 5 and the rod mounting insulator 6 is arranged in serial relation with each other so as to form the other vibration route. These vibration routes exist in parallel relation with each other between the upper support 4 (the vehicle body) and the wheel 9 to be suspended therefrom and are isolated from each other.

The conventional upper mounting structure of an isolated input type as mentioned above with respect to FIGS. 1 and 2 has following problems which will be discussed. In the isolated input type structure, the strut mounting insulator 6 is preferably designed to have relatively low stiffness (low spring constant) in vertical, longitudinal and transverse directions of the vehicle body in order to prevent low frequency vibration from a road to the strut assembly 5 from transmitting to the vehicle body and thus to realize a comfortable ride feeling of the vehicle. On the contrary, the spring insulator 3 has to support vehicle weight only by itself and then is preferably designed to have higher stiffness (higher spring constant) than the strut mounting insulator 6 (for example, more than twice of stiffness of the insulator 6). These designs of insulators 3 and 6 give rise to a coexistence of the comfortable ride feeling and the reliable support of vehicle weight at high level.

The conventional upper mounting structure of an isolated input type, however, is not capable of enhancing a performance which suppresses a transmission of vibration to the vehicle body, as will be appreciated from following descriptions.

In FIGS. 1 and 2, when a vertical surge vibration of the coil spring 1 is energized by vibration input from a road, this surge vibration is also transmitted to the outer sleeve of the strut assembly 5 through a lower end of the coil spring 1, since the spring insulator 3 is of high stiffness as mentioned above. On the other hand, within a surge vibration range of high frequency at which the coil spring 1 tends to cause said surge vibration, a telescopical movement between the piston rod 5a and the outer sleeve of the strut assembly 5 is remarkably suppressed because of a large damping effect thereof within the higher frequency range. Therefore, the surge vibration to the strut assembly 5 from the coil spring 1 is directly transmitted to the piston rod 5a of the strut assembly 5. Still now, the strut mounting insulator 6 is of a relatively low stiffness as mentioned above, and thus the strut assembly 5, upon acceptance of the surge vibration, is easily oscillated in the axial direction as a whole. This axial oscillation of the strut assembly 5 is transmitted to the vehicle body as follows.

The axial oscillation of the strut assembly 5 causes the knuckle to be rocked about a center of gravity thereof and this rock motion of the knuckle results in transverse vibration of the vehicle body since the knuckle is articulated to the vehicle body through the plurality of links. This transverse vibration of the vehicle body also gives rise to a compartment noise.

SUMMARY OF THE INVENTION

Therefore, it is an object of the present invention to solve the above problems in the prior art.

Another object of the present invention is to provide an improvement of an isolated input type of upper mounting structure for a wheel suspension to make it possible to reduce a transverse vibration of a vehicle body due to a surge vibration of a coil spring within higher frequency range and to provide a comfortable ride feeling of a vehicle without disappearance of superior characteristics of an isolated input type of upper mounting structure for a wheel suspension.

In order to accomplish the above-mentioned and other objects, it is one aspect of the present invention to provide an upper mounting structure for a wheel suspension, comprising:

a strut assembly including an outer sleeve and a piston rod telescopically movable with respect to each other for suspension stroke, one of which supports a wheel rotatably, and the other is to be coupled with a vehicle body;

a coil spring effecting between said outer sleeve and said piston rod to energize the strut assembly in its extending direction;

a spring support on which an upper end of said coil spring near the vehicle body is seated;

an upper support attached to said spring support through a spring insulator and adapted to be fastened to the vehicle body;

a strut mounting insulator through which said upper support is coupled with the piston rod or outer sleeve of the strut assembly to be coupled with the vehicle body; and an additional insulator for connecting between said spring support and said piston rod or outer sleeve of the strut assembly to be coupled with the vehicle body.

According to another aspect of the invention, it is preferable that said additional insulator has higher stiffness than said spring insulator within a higher frequency range.

In such preferred embodiment it is assured that a transverse vibration of a vehicle body due to a surge vibration of a coil spring is reduced within the higher frequency range and that a comfortable ride feeling of a vehicle is provided.

According to a further aspect of the invention, it is preferable that said additional insulator has lower stiffness than said strut mounting insulator within a lower frequency range.

In this preferred embodiment it is assured that superior characteristics of an isolated input type of upper mounting structure for a wheel suspension is maintained without change.

According to a still further aspect of the invention, it is preferable for the foregoing objects that said higher frequency range corresponds to a frequency range within which a surge vibration of said coil spring tends to occur.

A preferred example of the above-mentioned additional insulator is a hydraulic mount. As a hydraulic mount a shear type one may be used, which is deformed in shear direction. Another type of hydraulic mount is a compression type hydraulic mount, which is deformed in compression direction.

According to a still further aspect of the invention, it is preferable that said additional insulator is an active control insulator, stiffness of which is determined by a control signal.

It is more preferable, of course, that the active control insulator is controlled by said control signal to have higher stiffness than said spring insulator within the higher frequency range and to have lower stiffness than said strut mounting insulator within the lower frequency range.

According to a still further aspect of the invention, it is preferable for the foregoing objects that said higher frequency range corresponds to a frequency range within which a surge vibration of said coil spring tends to occur.

According to a still further aspect of the invention, it is preferable that said spring insulator is a dish spring. In this case the spring insulator provides relatively high freedom of designing with respect to stiffness ratio between the spring insulator and the strut mounting insulator, even though the spring insulator is designed to certainly support a vehicle weight.

DESCRIPTION OF THE PREFERRED EMBODIMENTS

Figure 3:
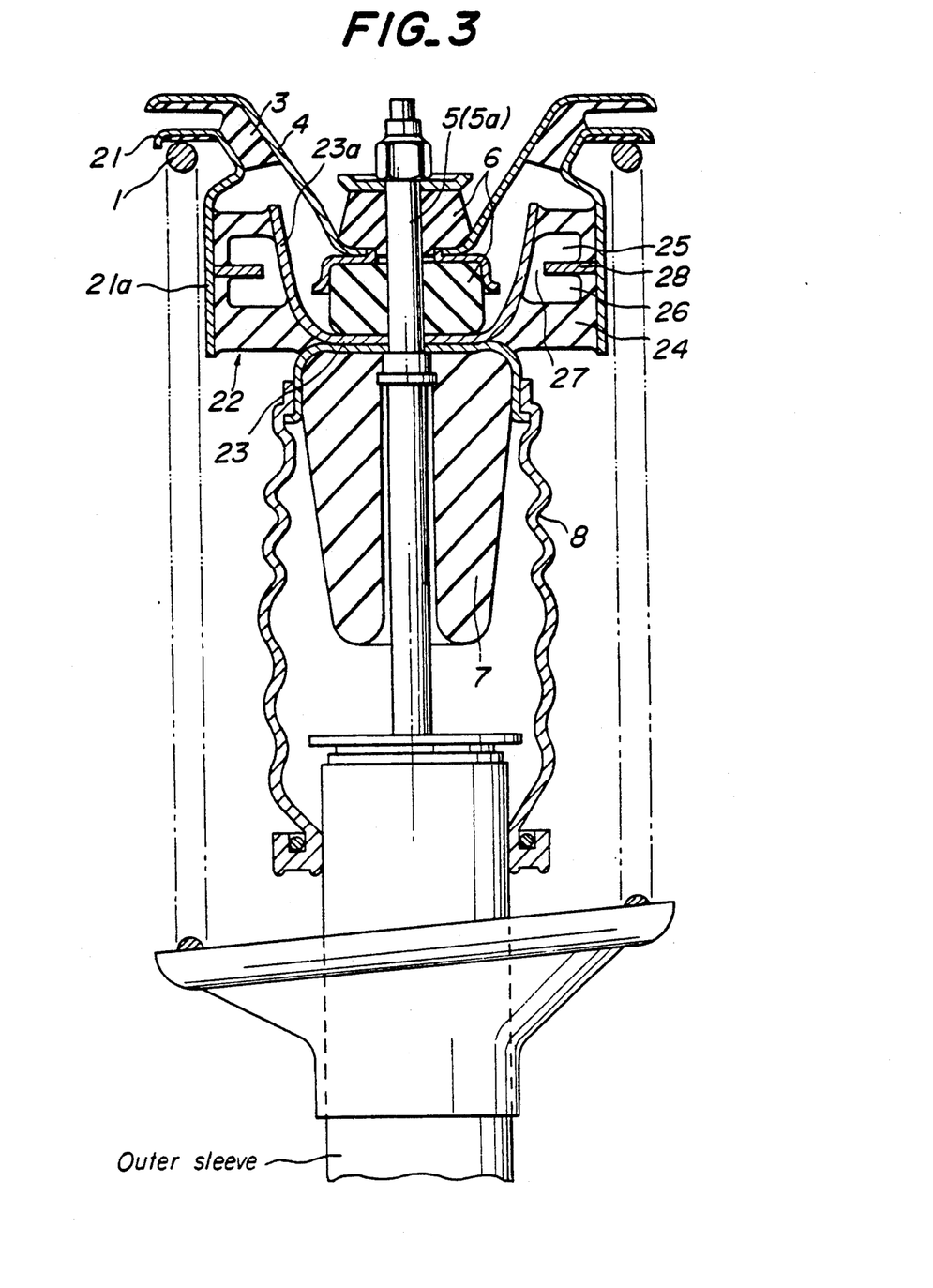
FIG. 3 is a longitudinal cross sectional view of a preferred embodiment of an upper mounting structure for a wheel suspension according to the present invention.

Referring now to the drawings, FIG. 3 shows a preferred embodiment of an upper mounting structure for a strut-type wheel suspension formed in accordance with the present invention. The shown structure is essentially based on a so-called isolated input type upper mounting structure in FIGS. 1 and 2, in which a vibration transmission route including a coil spring is isolated from a vibration transmission route including a strut assembly. In FIG. 3, constructional elements similar to those in FIG. 1 are represented with same reference numerals.

A coil spring 1 is seated at its upper end on a spring support 21 which is adhered to an upper support 4 through a spring insulator 3 made from solid rubber material. The upper support 4 is adapted to be fastened to a vehicle body, e.g., by a bolt and nut means. The coil spring 1 is also resiliently or rigidly engaged at its lower end with an outer sleeve not shown of a strut assembly 5 which further includes a piston rod 5a telescopically movable with respect to the above-mentioned outer sleeve.

The piston rod 5a of the strut assembly 5 freely penetrates through a central opening of the upper support 4 and is resiliently secured thereto through a pair of strut mounting insulators 6 each made from solid rubber material. These strut mounting insulators 6 are arranged on either side of the upper support 4 to hold it therebetween and to provide a certain resilient connection between the piston rod 5a and the upper support 4.

In the shown structure according to the invention, particularly, an additional insulator 22 is arranged to bridge between the piston rod 5a of the strut assembly 5 and the spring support 21. In this case the additional insulator 22 is a hydraulic mount type insulator as will be explained thereafter, and then for preferred arrangement of such insulator 22 the spring support 21 is provided at its inner peripheral edge with a sleeve-shaped outer tube 21a integrally formed thereto and extending downwardly. Furthermore, the piston rod 5a is provided at its end near the upper support 4 with a mount support 23 secured to the piston rod 5a, which mount support 23 is provided at its outer peripheral edge with a sleeve-shaped inner tube 23a integrally formed thereto and extending upwardly. The inner tube 23a is positioned in the outer tube 21a in substantially coaxial relation thereto, which outer tube 21a is provided at its inner peripheral surface with an annular orifice plate 28 secured thereto so as to form a restricted annular orifice path 27 between the inner tube 23a and the orifice plate 28. On both sides of the orifice plate 28 there are arranged a pair of resilient members 24 made from solid rubber material respectively, each of which is adhered to a corresponding side of the orifice plate 28, the outer tube 21a and the inner tube 23a so as to form upper and lower hydraulic chambers 25 and 26 communicated to each other through the orifice path 27.

Figure 4:
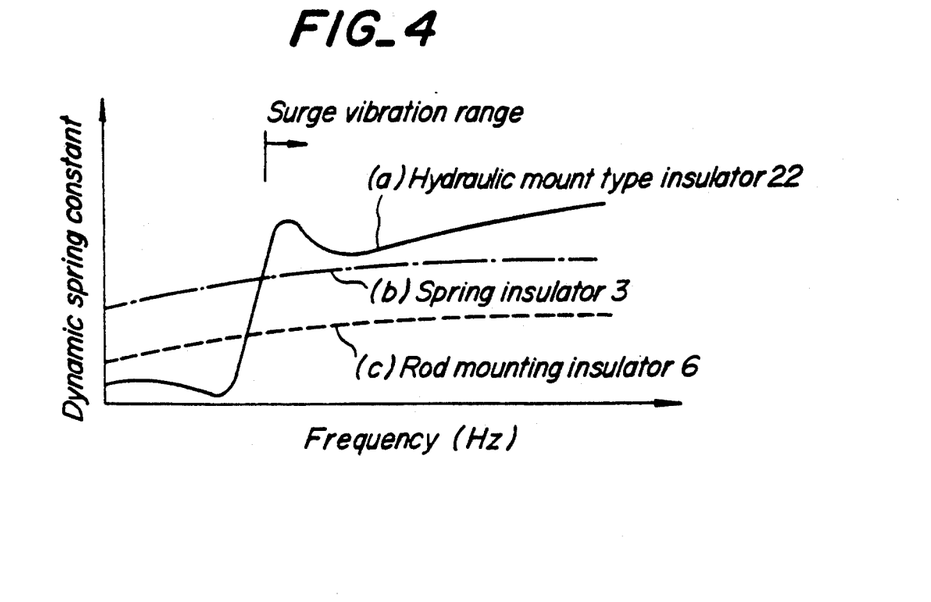
FIG. 4 shows characteristics of dynamic spring constant to input frequency relative to various insulators in the structure according to the invention as shown in FIG. 3.

The hydraulic mount type insulator 22 formed in such manner is of a so-called shear type well-known as an engine mount by those skilled in the art, which is deformed in shear direction to perform a desired characteristic. The desired characteristic is preferably determined, for example, as shown in FIG. 4 in relation to a surge vibration range of the coil spring 1 and characteristics of other insulators 3 and 6. In FIG. 4 a solid line (a) represents a frequency-dynamic spring constant characteristic of the hydraulic mount type insulator 22, a dot and dash line (b) represents a frequency-dynamic spring constant characteristic of the spring insulator 3, and a dot line (c) represents a frequency-dynamic spring constant characteristic of the rod mounting insulator 6. As can be seen in this figure, the spring constant of the spring insulator 3 is higher than that of the rod mounting insulator 6 over whole frequency range for the purpose as already described with respect to FIGS. 1 and 2, and the dynamic spring constant of the hydraulic mount type insulator 22 is higher than that of the spring insulator 3 within the surge vibration range (higher frequency range), but is lower than that of the strut mounting insulator 6 within the lower frequency range except for the surge vibration range. For the above the characteristic of the hydraulic mount type insulator 22 has a peak of dynamic spring constant at the substantially same frequency (for example, 80 Hz) as the lowermost frequency within the surge vibration range.

Figure 5:
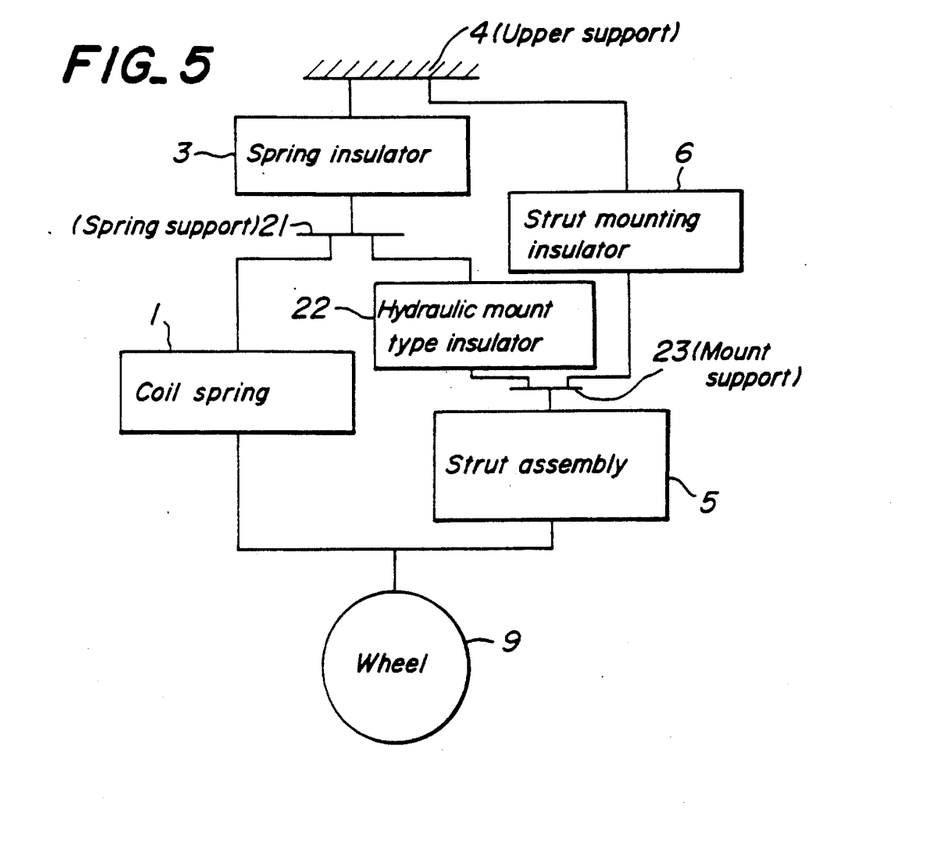
FIG. 5 is a schematic view showing a vibration system model of the structure according to the invention as shown in FIG. 3.

The structure shown in FIG. 3, which is established by adding the above-mentioned hydraulic mount type insulator 22 to the isolated type structure in accordance with the invention, is schematically designated in FIG. 5 as a vibration system model. The shown structure is capable of reducing a transmission of surge vibration of the coil spring 1 to the vehicle body as follows, which surge vibration is energized by a vibration input from a road within the higher frequency range.

In FIGS. 3 and 5, when the vertical surge vibration of the coil spring 1 is energized by vibration input from a road, this surge vibration is also transmitted to the outer sleeve of the strut assembly 5 through a lower end of the coil spring 1, since the spring insulator 3 is of relatively high stiffness as shown in FIG. 4. On the other hand, within the surge vibration range of high frequency at which the coil spring 1 tends to cause said vertical surge vibration, the telescopical movement between the piston rod 5a and the outer sleeve of the strut assembly 5 is remarkably suppressed because of large damping effect of the strut assembly 5 within such higher frequency range. Because of this, the surge vibration to the strut assembly 5 from the coil spring 1 is directly transmitted to the piston rod 5a of the strut assembly 5.

On the contrary, the strut mounting insulator 6 is of relatively low stiffness as shown in FIG. 4. Therefore, in the conventional structure in which the strut assembly 5 is mounted to the vehicle body merely through the strut mounting insulator 6, the strut assembly 5 may be easily oscillated in its axial direction as a whole when the surge vibration of the coil spring 1 has occurred and has been transmitted to the strut assembly 5. This axial oscillation of the strut assembly 5 is transmitted to the vehicle body to cause its transverse vibration as mentioned with respect to the prior art.

The shown embodiment of the structure according to the invention, however, is capable of eliminating such drawbacks as follows because of the additional insulator 22 connecting between the piston rod 5a and the spring support 21. Describing in more detail, the additional insulator 22 which is of a hydraulic mount type has higher dynamic spring constant than the spring insulator 3 within the surge vibration range as shown in FIG. 4 and this makes the strut assembly 5 possible to effectively perform its damping effect in spite of low stiffness of the strut mounting insulator 6. Therefore, when the surge vibration of the coil spring 1 has occurred, the strut assembly 5 may surely absorb and damp the surge vibration transmitted thereto from the coil spring 1. This means that the above-mentioned axial oscillation of the strut assembly 5 is suppressed, and that the transverse vibration of the vehicle body due to the axial oscillation of the strut assembly 5 is reduced, thereby reducing compartment noise and providing a comfortable ride feeling of a vehicle.

On the other hand, the additional insulator 22 which is of a hydraulic mount type has lower dynamic spring constant than the strut mounting insulator 6 within the lower frequency range except for the surge vibration range as shown in FIG. 4. Therefore, within the lower frequency range the additional insulator 22 never affects a function of the strut assembly 5, the strut mounting insulator 6 and the spring insulator 3 so that the shown upper mounting structure according to the invention actuates similarly to the conventional structure and thus realizes a comfortable ride feeling together with a reliable support of vehicle weight.

Figure 6:
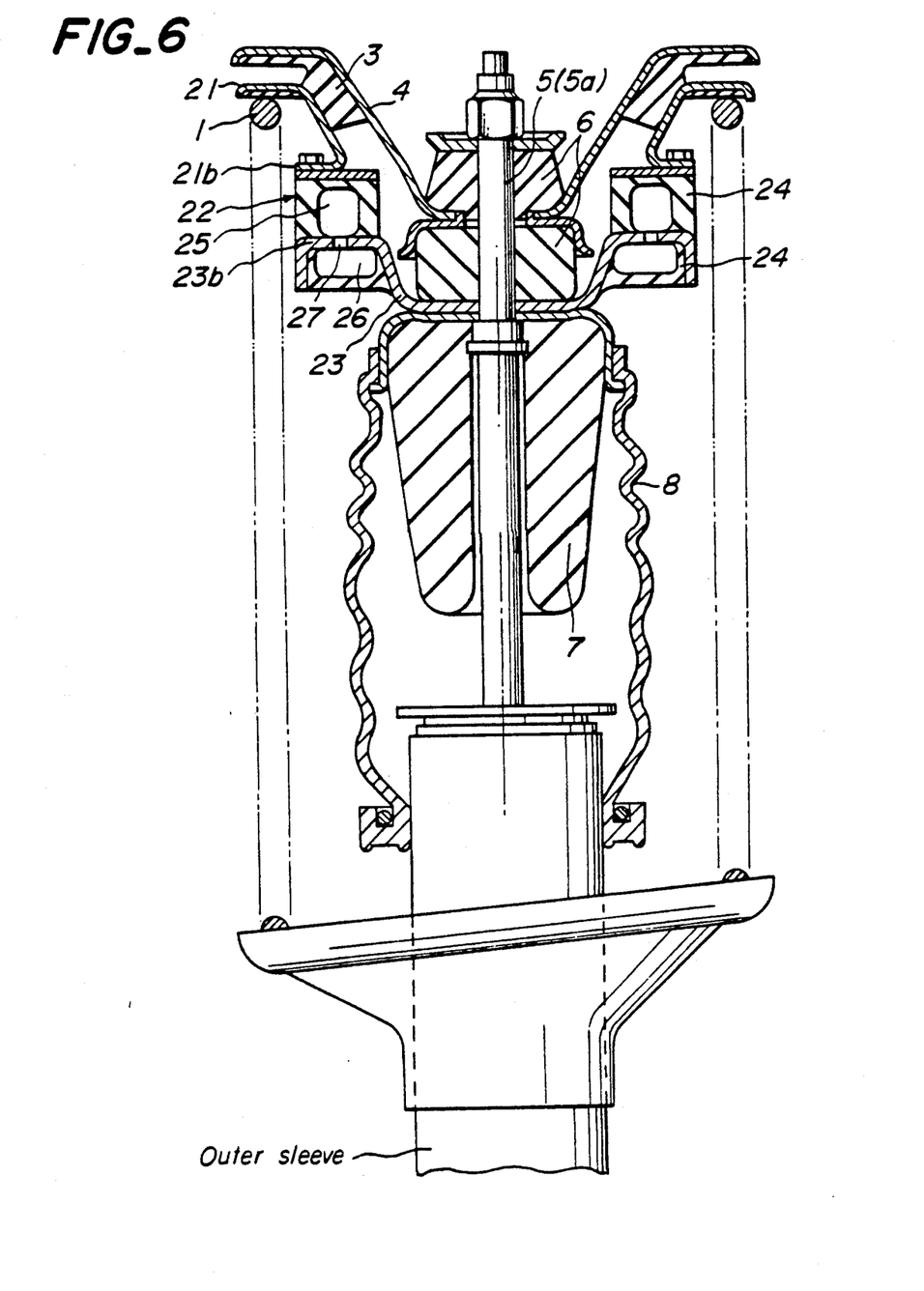
FIG. 6 is a longitudinal cross sectional view of a second preferred embodiment of an upper mounting structure for a wheel suspension according to the present invention.

FIG. 6 shows a second embodiment of an upper mounting structure for a wheel suspension according to the present invention. Also in this embodiment an additional insulator 22 consists of a hydraulic mount, but in this case the hydraulic mount is altered to a compression type hydraulic mount from the shear type hydraulic mount in the foregoing embodiment, which compression type hydraulic mount is deformed in compression direction instead of shear direction to perform its damping effect. In this case a spring support 21 is provided with an annular flange 21b extending in radial direction of a strut assembly 5 and then a mount support 23 is provided with an annular flange 23b extending in radial direction of the strut assembly 5, which is opposed to the flange 21a in axial direction of the strut assembly 5. On both sides of the flange 23b there are arranged a pair of resilient members 24 one of which is adhered to a corresponding side of the flange 23b and the flange 21b so as to form an upper hydraulic chamber 25 and the other of which is adhered to a corresponding side of the flange 23b in such manner that a lower hydraulic chamber 26 is formed. The upper and lower hydraulic chambers 25 and 26 are communicated to each other through an orifice path 27 formed on the flange 23b in type of orifice port.

Also in this embodiment same functional effects as that in the first embodiment as set forth are achieved. This embodiment, furthermore, may provide easier tuning of a dynamic spring constant of the hydraulic mount type insulator 22.

Figure 7:
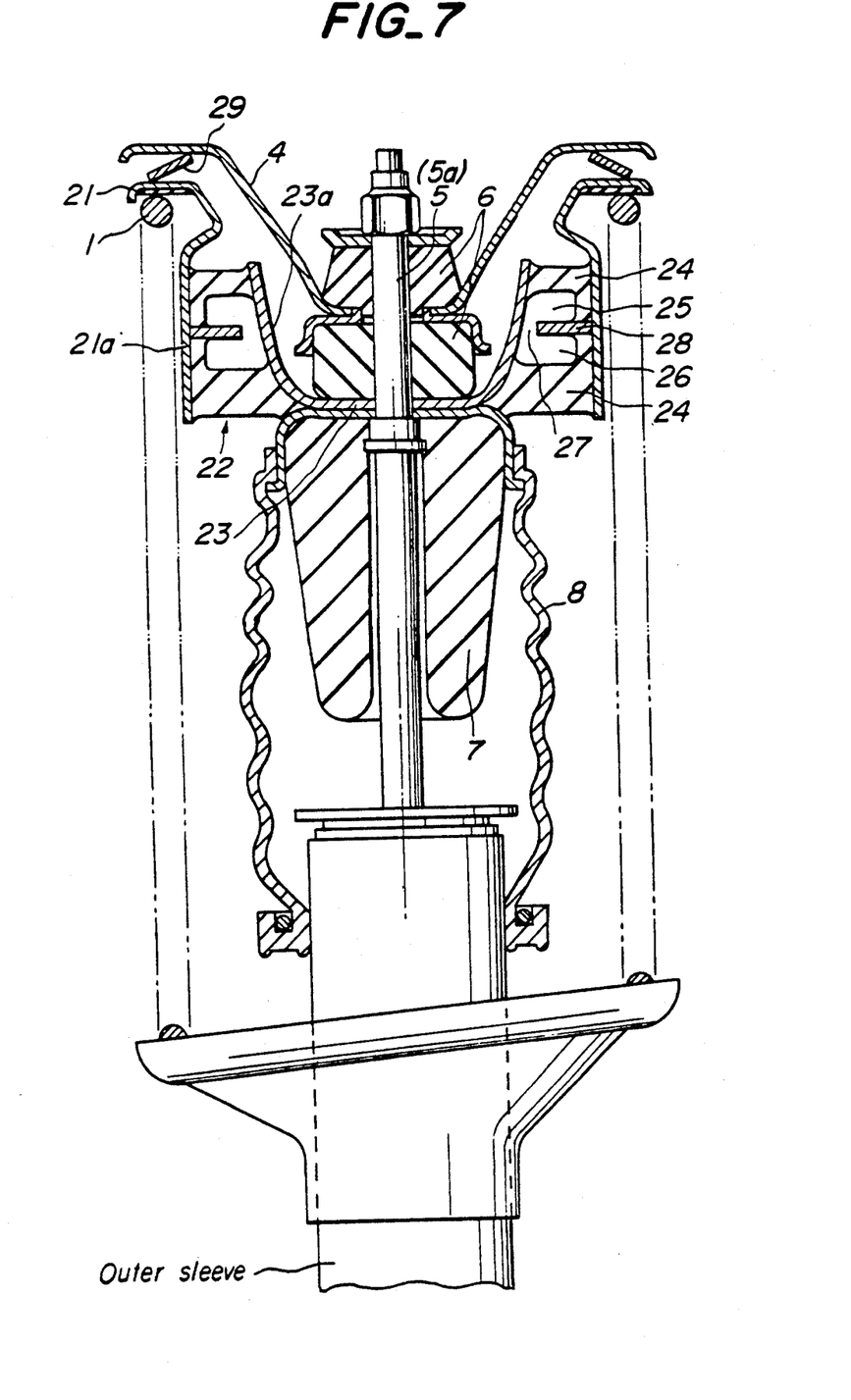
FIG. 7 is a longitudinal cross sectional view of a third preferred embodiment of an upper mounting structure for a wheel suspension formed in accordance with the present invention.

FIG. 7 shows a third embodiment of an upper mounting structure for a wheel suspension according to the present invention. The structure in this embodiment is established by construction in which a spring insulator 29 consists of a dish spring instead of a solid rubber material. This results in more reduction in dynamic spring constant of the spring insulator 29, thereby providing a higher freedom of setting of spring constants with respect to other insulators 6 and 22.

Although the third embodiment in FIG. 7 has been realized by alteration of the spring insulator 3 made from the solid rubber material in the structure shown in FIG. 3 to the above-mentioned dish spring 29, the construction in which the spring insulator consists of the dish spring 29 as in FIG. 7 may be also applied to the structure in FIG. 6.

Figure 8:
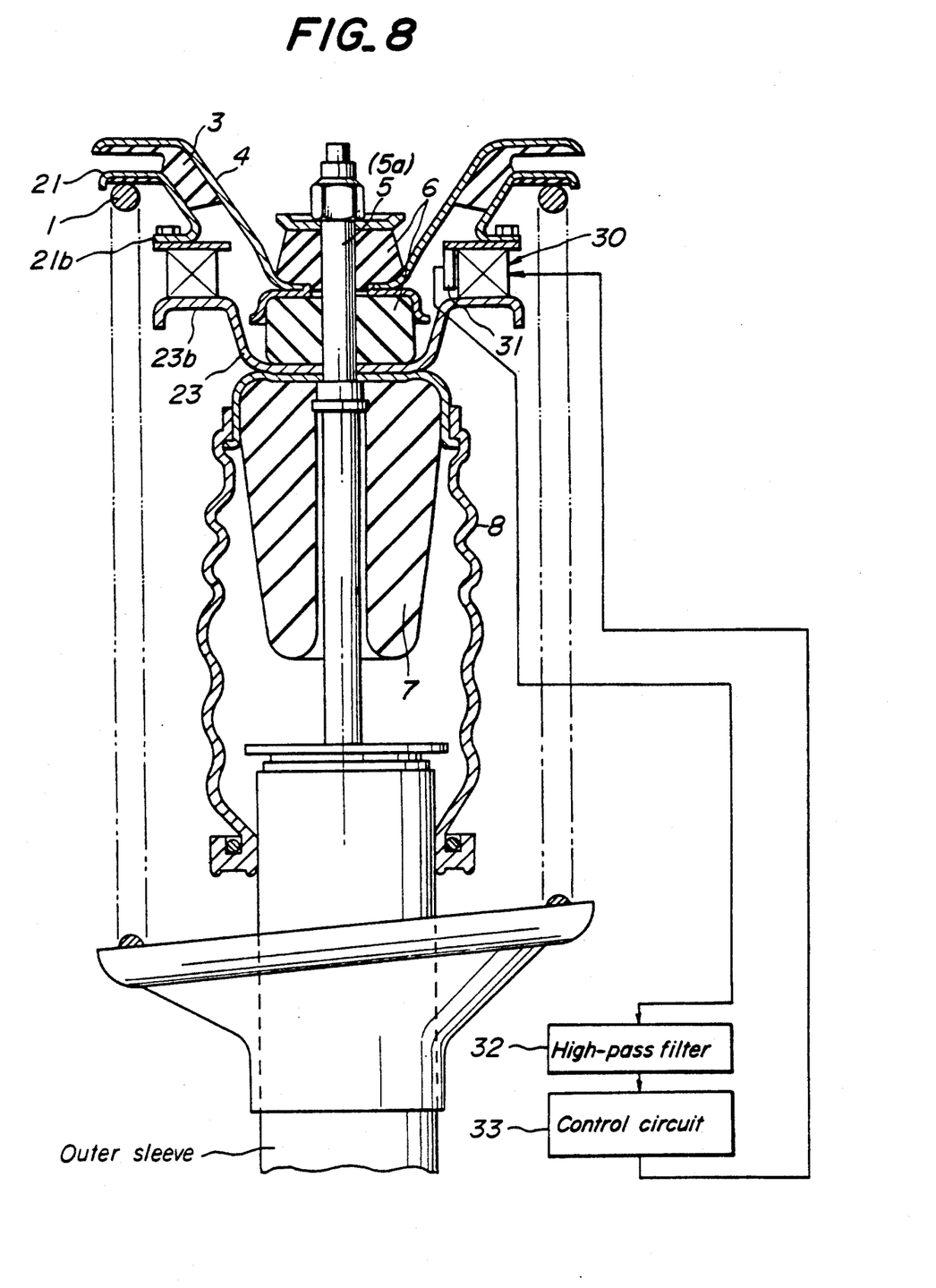
FIG. 8 is a longitudinal cross sectional view of a fourth preferred embodiment of an upper mounting structure for a wheel suspension according to the present invention.

FIG. 8 shows a fourth embodiment of an upper mounting structure for a wheel suspension according to the present invention. The structure in this embodiment is established by construction in which an additional insulator consists of an active control insulator 30 instead of said hydraulic mount type insulator 22. The active control insulator 30 is interposed between the flanges 21b and 23b and is adapted to be controlled by a control signal so as to be increased or decreased in its stiffness. The active control insulator 30 may be of an electromagnetic type, a piezoelectric type or a supermagnetostrictive type.

A control system for the active control insulator 30 is as follows. The flange 21b is provided with a stroke sensor 31 fixed thereto, which may detect a displacement between the flanges 21b and 23b. There are further provided a high-pass filter 32 and a control circuit 33 which cooperate with the stroke sensor 31 to form the control system for the active control insulator 30. A cut-off frequency of the high-pass filter 32 is determined, for example, to be substantially the same as the lowermost frequency within said surge vibration range. A detection signal of the stroke sensor 31 is delivered to the control circuit 33 through the high-pass filter 32. The control circuit 33 actuates according to an information from the high-pass filter 32 to control the active control insulator 30 in such manner that the active control insulator 30 prevents the displacement between the flanges 21b and 23b within the surge vibration range. Within the lower frequency range except for the surge vibration range, however, no information from the high-pass filter 32 is transmitted to the control circuit 33 and the control circuit 33 never delivers the control signal to the active control insulator 30. Therefore, within the lower frequency range the active control insulator 30 is in its normal condition and never affect the displacement between the flanges 21b and 23b.

Alternatively, the active control insulator 30 and the control system thereof may be adapted to achieve a stiffness characteristic, for example, as shown in FIG. 4 with the solid line (a).

Also in this embodiment same functional effects as those in the first embodiment as set forth are achieved. This embodiment, furthermore, may provide easier application to various upper mounting structures of which coil springs have different properties, since the active control insulator 30 has a higher freedom of selection of its stiffness characteristic than the hydraulic mount type insulator 22 in the previous embodiments.

Moreover, in this embodiment the spring insulator 3 made from the solid rubber material may be replaced by the spring insulator 29 of the dish spring type as shown in FIG. 7.

What is claimed is:

1. An upper mounting structure for a wheel suspension, comprising:
   (a) a strut assembly including an outer sleeve and a piston rod telescopically movable with respect to each other, one of which supports a wheel rotatably and the other is to be coupled with a vehicle body;
   (b) a coil spring between said outer sleeve and said piston rod to energize the strut assembly in its extending direction;
   (c) a spring support on which an upper end of said coil spring is seated;
   (d) an upper support attached to said spring support through a spring insulator and adapted to be fastened to the vehicle body;
   (e) a strut mounting insulator through which said upper support is coupled with either one of the piston rod or an outer sleeve of the strut assembly to the vehicle body; and
   (f) an additional insulator connected between said spring support and said either one of the piston rod or outer sleeve of the strut assembly to the vehicle body, wherein the additional insulator is an active control insulator, stiffness of which is determined by a control signal, and further wherein the additional insulator has higher stiffness than the spring insulator within a higher frequency range and a lower stiffness than the strut mounting insulator within a lower frequency range.

2. An upper mounting structure for a wheel suspension as set forth in claim 1, wherein said active control insulator is controlled by said control signal to have higher stiffness than said spring insulator within the higher frequency range.

3. An upper mounting structure for a wheel suspension as set forth in claim 1, wherein said active control insulator is controlled by said control signal to have lower stiffness than said strut mounting insulator within the lower frequency range.

4. An upper mounting structure for a wheel suspension as set forth in claim 2 or 3, wherein said higher frequency range corresponds to frequency range within which a surge vibration of said coil spring tends to occur.

5. An upper mounting structure for a wheel suspension, comprising:
   (a) a strut assembly including an outer sleeve and a piston rod telescopically movable with respect to each other, one of which supports a wheel rotatably and the other is to be coupled with a vehicle body;

(b) a coil spring between said outer sleeve and said piston rod to energize the strut assembly in its extending direction;

(c) a spring support on which an upper end of said coil spring is seated;

(d) an upper support attached to said spring support through a spring insulator and adapted to be fastened to the vehicle body;

(e) a strut mounting insulator through which said upper support is coupled with either one of the piston rod or an outer sleeve of the strut assembly to the vehicle body; and (f) an additional insulator connected between said spring support and said either one of the piston rod or outer sleeve of the strut assembly to the vehicle body, wherein the additional insulator is a hydraulic mount, and further wherein the additional insulator has a higher stiffness than the spring insulator within a higher frequency range and a lower stiffness than the strut mounting insulator within a lower frequency range.

6. An upper mounting structure for a wheel suspension as set forth in claim 5, wherein said hydraulic mount is a shear mount, which is deformed in the direction of shear of said mount.

7. An upper mounting structure for a wheel suspension as set forth in claim 5, wherein said hydraulic mount is a compression mount, which is deformed in the direction of compression of said mount.

* * * * *